March 8, 1927.  1,620,283
J. C. PETERS ET AL
DOUBLE ROW GINSENG SEED DRILL
Filed June 13, 1924  2 Sheets-Sheet 2
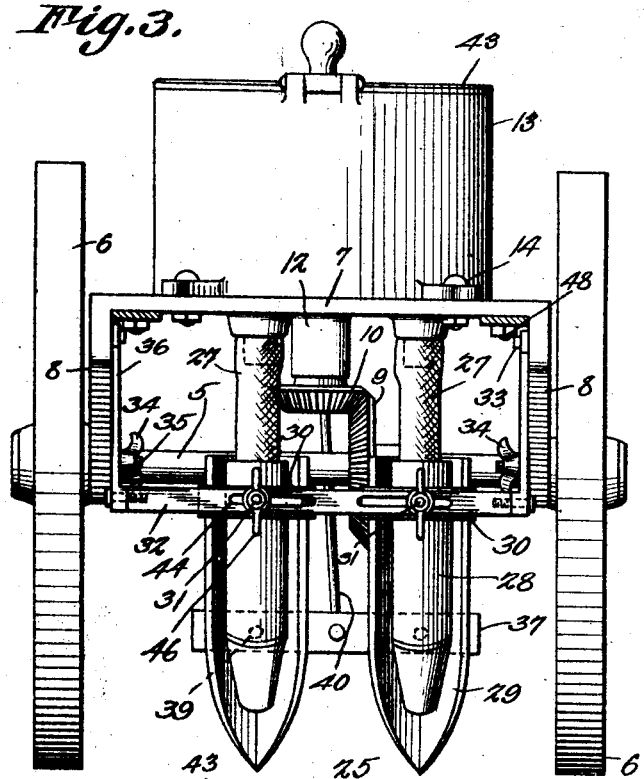
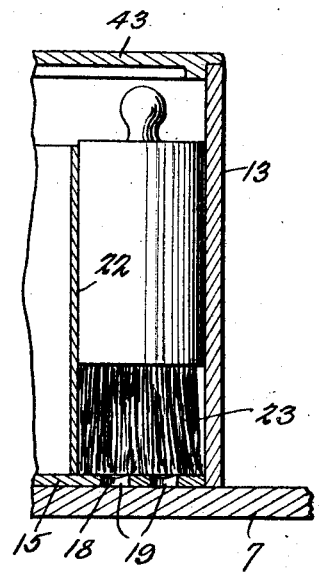
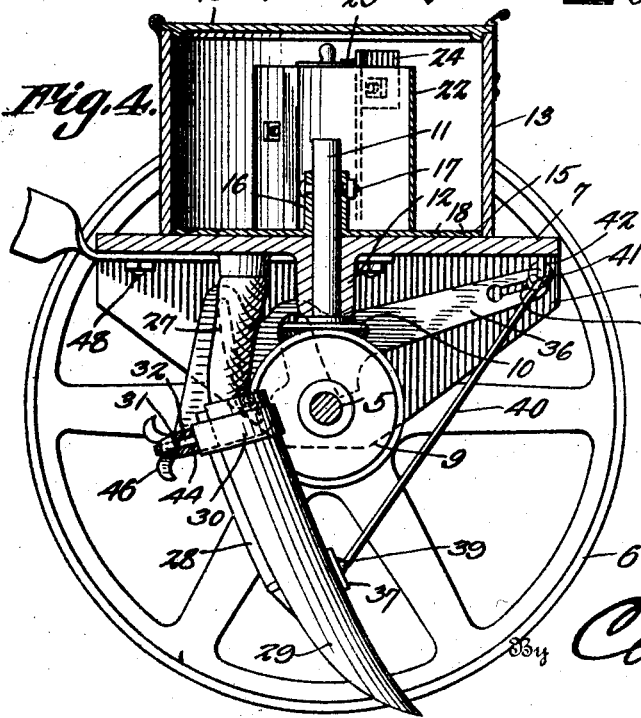
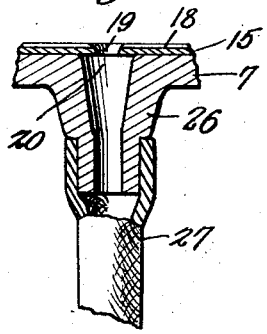
J. C. Peters
J. B. Peters
Inventors
By C. A. Snow & Co.
Attorneys Patented Mar. 8, 1927.

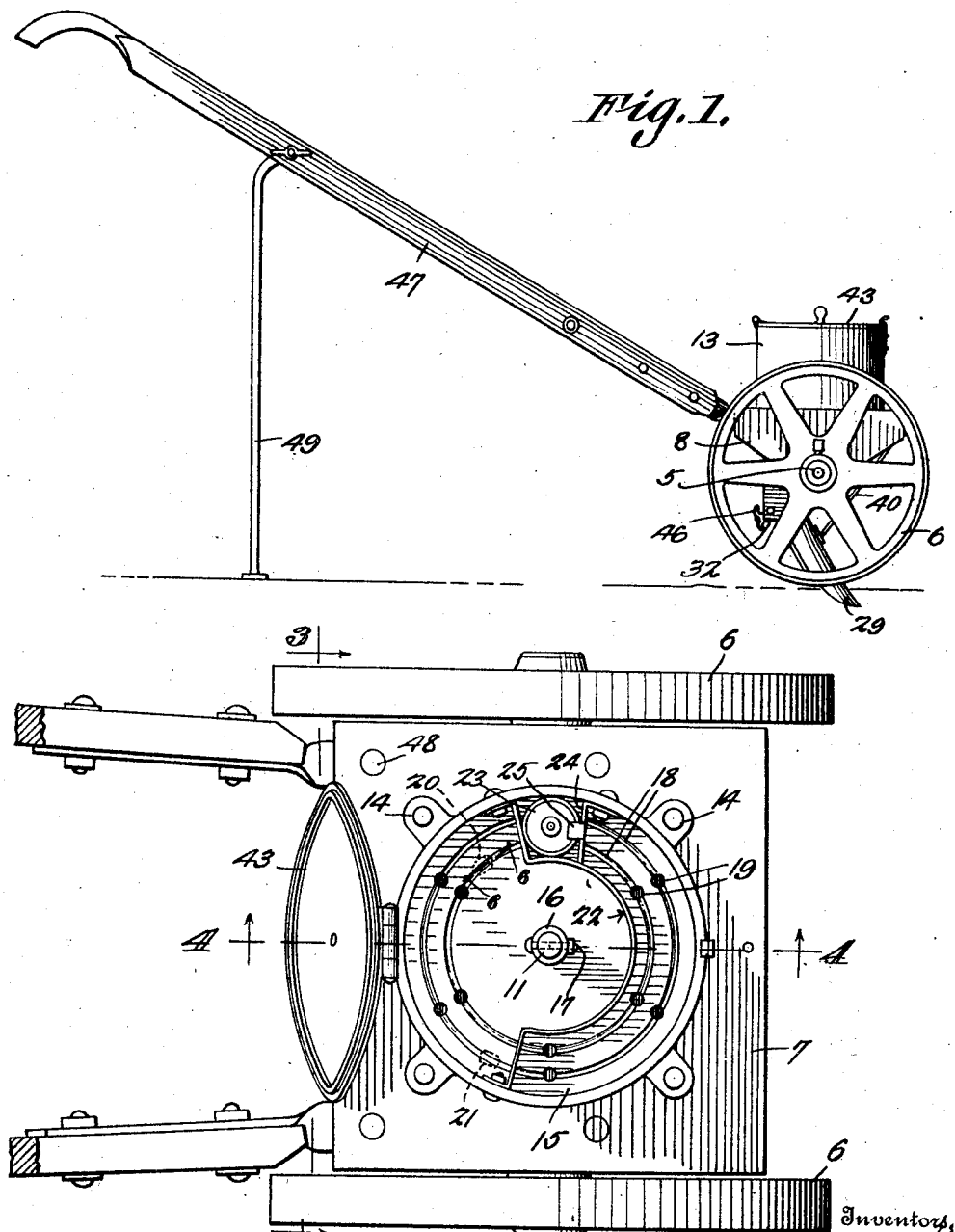

1,620,283

UNITED STATES PATENT OFFICE.

JAMES C. PETERS AND JAMES BRICE PETERS, OF REEDSVILLE, PENNSYLVANIA.

DOUBLE-ROW GINSENG SEED DRILL.

Application filed June 13, 1924. Serial No. 719,843.

This invention relates to seed drills and more particularly to a seed drill especially designed for drilling ginseng seed, the primary object of the invention being to provide a drill which will deposit seed singly, eliminating any possibility of more than one seed being deposited at each operation of the machine.

An important object of the invention is to provide means for adjusting the drill shovels laterally in order that the seed may be deposited greater or less distances apart at the will of the operator.

A further object of the invention is the provision of means, whereby the drill shovels and spouts supported at the rear thereof may be adjusted vertically.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a seed drill constructed in accordance with the invention.

Figure 2 is a plan view thereof showing the cover as moved to its inactive position.

Figure 3 is a sectional view taken on line 3—3 of Figure 2.

Figure 4 is a sectional view taken on line 4—4 of Figure 2.

Figure 5 is a fragmental sectional view through the seed box showing the means for sweeping the seed groove of the delivery disk.

Figure 6 is a sectional view taken on line 6—6 of Figure 2, disclosing the connection between the flexible seed tubes and the relatively short pipes extending from the bottom of the drill box.

Referring to the drawings in detail, the drill includes a supporting axle 5 on which the wheels 6 are mounted, one of the wheels being keyed or otherwise secured to the axle 5 so that rotary movement of the wheels 6 will produce a relative movement of the axle 5, for purposes to be hereinafter more fully described.

The frame of the drill includes a plate 7 and depending side members 8, which side members are formed with suitable openings to accommodate the axle 5 at points adjacent to the ends thereof. Mounted on the axle 5 is a pinion 9 that rotates therewith and meshes with the pinion 10 operating in a horizontal plane and carried at the lower end of the vertical shaft 11 which extends through the bearing 12 formed in the plate 7, and has its upper end extending into the seed box 13 mounted on the plate 7 and secured thereto by means of the bolts 14.

Mounted for rotation within the seed box 13 is a distributing disk 15 formed with an upwardly extended bearing 16 that embraces a portion of the shaft 11 and is secured thereto by means of the bolt 17 so that as the shaft 11 rotates, the distributing disk 15 will also be rotated to accomplish its purpose.

The upper surface of the distributing disk 15 is formed with circular grooves 18 arranged in spaced relation with each other and as shown, communicate with the seed cups 19, which cups 19 are of diameters slightly greater than the diameters of the ginseng seed drilled by the machine, it being understood that ginseng seeds are round and flat and are of substantially uniform diameters, to the end that when a seed enters a seed cup 19 other seeds will be excluded therefrom, to the end that only a single seed will be deposited through the opening at each operation.

These seed cups 19 are arranged in pairs as clearly shown by Figure 2 of the drawings, the inner openings being adapted to register with the discharge opening 20 at one side of the seed box 13, while the discharge openings 19 of the outer circle are designed to register with the openings 21, which openings are formed in the plate 7 so that seed passing through the openings will be deposited predetermined distances apart.

Positioned within the seed box is a curved partitioning wall 22 that divides the seed box into a seed containing compartment and a delivery compartment, it being understood that as the distributing disk rotates, seeds are carried from the seed containing compartment into the delivering compartment where they are dropped through the openings 20 and 21.

Arranged within the seed containing compartment and disposed adjacent to one end thereof, is a brush 23 held in an upright position, so that the bristles thereof will sweep the upper surface of the disk 15. The brush is held by the removable plate 24 that has a laterally extending finger 25 overlying the upper edge of the brush. From the foregoing it will be obvious that as the disk 15 rotates and the openings 19 thereof become filled, surplus seeds will be swept from the openings to the end that only a single seed will be deposited at one operation.

The walls of the openings 20 and 21 are formed into relatively short discharge pipes 26 to which are connected flexible discharge tubes 27 that have their lower ends extended into the spouts 28 which are formed with any desirable material.

The spouts 28 lie behind the drill shovels 29 and are connected thereto by means of the yokes 30 that connect with the drill shovels 29 there being provided bolts 31 extending through the yokes and through the frame 32 for holding the shovels and spout in predetermined positions. The frame 32 is pivotally connected to the main frame at 33 so that the frame 32 may be adjusted vertically to cause the drill shovels to operate at various distances with respect to the ground surface so that a deep or shallow furrow may be made, at the will of the operator. It will also be understood that due to this construction the drill shovels and drill spouts may be moved upwardly to their inactive positions, and out of contact with the ground surface when the drill is to be moved from place to place. In order that the frame 32 may be held in its positions of adjustment, winged nuts 34 are mounted on the ends of the bolts 35 that extend inwardly from the main frame, the winged nuts being positioned to engage the side members 36 of the frame 32 when they are moved to their active positions.

Connecting the drill shovels is a bar 37 which is formed with openings through which the bolts 39 extend, which bolts 39 have connection with the drill shovels so that a pivotal movement of the drill shovels may be had.

A rod 40 has connection with the bar 37 and has pivotal connection through the eyes 41 and 42 with the plates 7 to brace the shovels against rearward movement. A cover indicated at 43 closes the upper portion of the seed box to prevent the seed from passing outwardly therefrom, while in use.

Elongated openings 44 are provided in the rear bar of the frame 32 and as shown by Figure 2 of the drawings, accommodate the bolts 31 which are supplied with winged nuts 46 that are adapted to frictionally engage the rear bar of the frame 32 to hold the drill shovels and spouts in predetermined positions of adjustment.

In order that the device may be conveniently operated, handles 47 are provided and have connection with the plate 7 at 48. A pivoted prop 49 has connection with one of the handles and is designed to be swung to a position as shown by Figure 1 of the drawings in order that the drill may be supported in an upright position when not in use.

It might be further stated that if it is desired to plant seed closer together, as for example, in planting a nursery, the distributing disk 15 may be removed and a distributing disk provided with openings 19 which are disposed in closer relation with each other, may be substituted for the disk shown in the present drawings, without departing from the spirit of the invention.

In view of the foregoing detail description it is believed that a further detail description of the operation of the device is unnecessary.

We claim:

A drill including a wheel supported frame, said frame having a discharge opening, a seed box mounted on the frame, a partitioning member within the seed box and dividing the seed box into a receiving chamber and a curved passageway, a rotary member having spaced openings formed therein and having grooves establishing communication between the openings, means for rotating the rotary member, and a brush at one end of the passageway for sweeping seed resting on the upper surface of the rotary member.

In testimony that we claim the foregoing as our own, we have hereto affixed our signatures.

JAMES C. PETERS.
JAMES BRICE PETERS.